United States Patent
Haun et al.

(10) Patent No.: US 12,451,264 B2
(45) Date of Patent: Oct. 21, 2025

(54) METHODS FOR EXTRACTING RADIOISOTOPES FROM RADIOLOGICALLY CONTAMINATED WASTE

(71) Applicant: EnergySolutions, LLC, Salt Lake City, UT (US)

(72) Inventors: Steven Haun, Kingsport, TN (US); Paul Sylvester, Denver, CO (US); Timothy Nicholas Milner, Lexington, SC (US); Colin Russell Austin, Port Charlotte, FL (US)

( * ) Notice: Subject to any disclaimer, the term of this patent is extended or adjusted under 35 U.S.C. 154(b) by 0 days.

(21) Appl. No.: 19/058,667

(22) Filed: Feb. 20, 2025

(65) Prior Publication Data
US 2025/0232889 A1    Jul. 17, 2025

Related U.S. Application Data

(63) Continuation-in-part of application No. PCT/US2024/042804, filed on Aug. 16, 2024.

(60) Provisional application No. 63/519,961, filed on Aug. 16, 2023.

(51) Int. Cl.
*G21F 9/30*    (2006.01)
*B01D 53/14*    (2006.01)
(Continued)

(52) U.S. Cl.
CPC ........... *G21F 9/30* (2013.01); *B01D 53/1475* (2013.01); *B01D 53/1493* (2013.01);
(Continued)

(58) Field of Classification Search
None
See application file for complete search history.

(56) References Cited

U.S. PATENT DOCUMENTS

| | | | |
|---|---|---|---|
| 4,927,796 A | * | 5/1990 | D'Angelo ............... B01J 47/133 502/62 |
| 5,286,468 A | | 2/1994 | Chang et al. |

(Continued)

FOREIGN PATENT DOCUMENTS

| | | |
|---|---|---|
| WO | WO 2016/078704 | 5/2016 |
| WO | WO 2023/139540 | 1/2023 |

OTHER PUBLICATIONS

"Application of Ion Exchange Processes for the Treatment of Radioactive Waste and Management of Spent Ion Exchangers," Technical Reports Series No. 408, International Atomic Energy Agency, Vienna, Jun. 2002 (124 pp.).
(Continued)

*Primary Examiner* — John J Figueroa
(74) *Attorney, Agent, or Firm* — FisherBroyles, LLP

(57) ABSTRACT

Methods are provided for separating radioisotopes from spent ion exchange resins used to process nuclear waste. In some embodiments, the resin is contacted with an aqueous solution including one or more acids to elute the radioisotopes into an enriched solution. In some embodiments, the resin is contacted with an aqueous solution including one or more salts, such as a sulfate or nitrate salt solution, to elute the radioisotopes into an enriched salt solution. The enriched solution can include at least 80%, or at least 95%, of the activity of radioisotopes such as Sr-90, Co-60, Ni-63, Cs-137, C-14, Co-58, and/or Mn-54 originally present in the resin. In some embodiments, a mixed bed resin is separated into cation and anion components, and the anion resin is treated to release C-14 as carbon dioxide gas which is captured and purified to obtain a C-14 product.

20 Claims, 5 Drawing Sheets

(51) Int. Cl.

| | |
|---|---|
| *B01D 53/62* | (2006.01) |
| *B01D 53/78* | (2006.01) |
| *B01D 53/80* | (2006.01) |
| *B01D 53/81* | (2006.01) |

(52) U.S. Cl.
CPC ............ *B01D 53/62* (2013.01); *B01D 53/78* (2013.01); *B01D 53/80* (2013.01); *B01D 53/81* (2013.01); *B01D 2251/304* (2013.01); *B01D 2251/404* (2013.01); *B01D 2251/408* (2013.01); *B01D 2251/604* (2013.01); *B01D 2257/504* (2013.01)

(56) References Cited

U.S. PATENT DOCUMENTS

| | | | | |
|---|---|---|---|---|
| 8,148,594 | B2* | 4/2012 | Denton | .............. C02F 9/00 |
| | | | | 588/315 |
| 2018/0308597 | A1* | 10/2018 | Strohmer | ............ G21F 9/307 |
| 2020/0109069 | A1 | 4/2020 | Yang et al. | |
| 2021/0225543 | A1* | 7/2021 | Sempere Belda | ........ G21F 9/30 |
| 2024/0371536 | A1* | 11/2024 | Vachon | .................... G21F 9/30 |

OTHER PUBLICATIONS

Bueur et al., "$^{14}$C Content in Candu Spent Ion Exchange Resins and Its Release Under Alkaline Conditions," Radiocarbon, vol. 60, Nr 6, pp. 1797-1808, Oct. 2018 (12 pp.).

Fee et al., "Molecular Sieves: An Alternative Method of Carbon Dioxide Removal Which Does Not Generate Compound A During Simulated Low-Flow Sevoflurane Anaesthesia," Anaesthesia, vol. 50, pp. 841-845, Oct. 1995 (5 pp.).

International Search Report and Written Opinion from parent Int'l Pat. App. PCT/US2024/042804, Nov. 28, 2024 (8 pp.).

International Search Report and Written Opinion from parent Int'l Pat. App. PCT/US2024/042804, Dec. 6, 2024 (10 pp.).

International Search Report and Written Opinion from parent Int'l Pat. App. PCT/US2024/042804, Dec. 30, 2024 (10 pp.).

* cited by examiner

METHODS FOR EXTRACTING RADIOISOTOPES FROM RADIOLOGICALLY CONTAMINATED WASTE

TECHNICAL FIELD

This relates to methods of harvesting and/or reusing radioisotopes from radiologically contaminated waste such as nuclear waste.

BACKGROUND

Radioisotopes are used in a wide range of applications including medical diagnosis and therapy, industrial processing and monitoring, and agricultural research. Radioisotopes are typically produced by irradiating stable isotopes in nuclear reactors or particle accelerators. However, such production methods can be costly, and many irradiation facilities are located outside the U.S., which can lead to unreliable radioisotope supplies.

Ion exchange resins are widely used in the nuclear industry to remove radioactive contaminants from liquid streams. Over time, the resins become saturated with radioisotopes and must be replaced. The spent resins are typically disposed of as radioactive waste by encasing them in high integrity containers or encapsulating them in concrete before burial at licensed radioactive disposal sites.

One challenge with disposing of spent ion exchange resins is that the radioisotopes represent a very small fraction of the resin mass. For example, the radioisotopes may account for less than 0.1% of the resin mass, while the bulk of the resin is composed of non-radioactive organic polymers such as styrene-divinylbenzene copolymers. Disposal of the spent resins therefore involves burying a large volume of material, of which only a small fraction is actually radioactive. This is not an efficient use of limited and costly disposal space.

Some conventional processes attempt to reduce the volume of spent ion exchange resins prior to disposal, for example by incinerating or chemically destroying the organic polymer. However, these methods can increase the concentration of radioisotopes in the residual waste material to the point that it may exceed radioactivity limits for acceptance at disposal facilities.

GENERAL DESCRIPTION

This describes methods to obtain radioisotopes from radiologically contaminated waste material such as nuclear waste. An example of such a source is spent ion exchange resins used to treat radioactive liquids generated at nuclear power plants, laboratories, and medical facilities (the ion exchange resins are used to extract radioisotopes from radioactive effluents and process liquids). Extracting and recycling radioisotopes from nuclear waste offers significant advantages over conventional production methods. First, it provides a U.S. domestic source of radioisotopes, improving supply chain security. Second, it reduces the volume of nuclear waste that must be disposed of in licensed facilities. Third, it has the potential to be significantly less expensive than conventional production methods that require the construction and operation of specialized nuclear facilities.

A low-cost method to sequentially extract and purify radioisotopes from spent ion exchange resins used for the treatment of radioactive effluents and process liquids are described. The method includes selectively extracting radioisotopes from the spent ion exchange resins and thermally processing the depleted resins to reduce their bulk mass after the desired radioisotopes have been extracted.

In some embodiments, the method further includes regenerating the spent ion exchange resins using standard industrial techniques after the usable radionuclides have been harvested, which provides greater waste avoidance. The extracted radionuclides are concentrated and purified for subsequent industrial and medical uses. The bulk ion exchange resin can be steam reformed into a glass-like inorganic waste product, reducing the volume for burial by at least 90%.

Another embodiment provides a method for extracting radioisotopes having industrial, medical, and/or agricultural applications from spent ion exchange resins. Examples of such radioisotopes include Co-60, Sr-90, Ni-63, Cs-137, C-14 and I-129, though not all these isotopes may be found in any particular resin. Many of these radioisotopes present challenges to disposal sites because they are largely bioavailable and therefore have low limits for acceptance at licensed waste disposal facilities. By recycling these radionuclides for reuse, their strategic and economic value is realized and the disposal difficulties are overcome.

In some embodiments, C-14 is separated from ion exchange resin used to process nuclear waste. The method includes separating anion resin components in the ion exchange resin from cation resin components, isolating the anion exchange resin in a separate vessel to form an isolated anion exchange resin, and treating the isolated anion exchange resin to release the C-14 as carbon dioxide gas or carbonate/bicarbonate anions. The released carbon dioxide gas can be captured with a scrubber to obtain a captured carbon dioxide fraction which can then be purified to form a C-14 product having an increased concentration of C-14. The carbonate/bicarbonate anions can be further treated to either liberate the C-14 as carbon dioxide gas or yield an insoluble carbonate species, such as calcium carbonate. The volume of the anion exchange resin can be reduced after treating it to release the C-14.

In some embodiments, radioisotopes are separated from ion exchange resin used to process nuclear waste. The method includes combining the ion exchange resin with an aqueous solution including a metal salt solution (nitrate salt, sulfate salt, chloride salt, acetate salt, and the like) to form a mixture. The ion exchange resin is separated from the mixture to form an enriched solution that includes at least 20%, or 20-100%, of one of the radioisotopes originally present in the ion exchange resin. Examples of radioisotopes that can be separated with this method include Ba-133, C-14, Co-57, Co-58, Co-60, Cs-134, Cs-137, I-129, Mn-54, Nb-95, Ni-63, Sb-124, Sb-125, Sn-113, Sr-90, Tb-160, Zn-65, and/or Zr-95.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which.

DETAILED DESCRIPTION OF EMBODIMENTS

Figure 1:
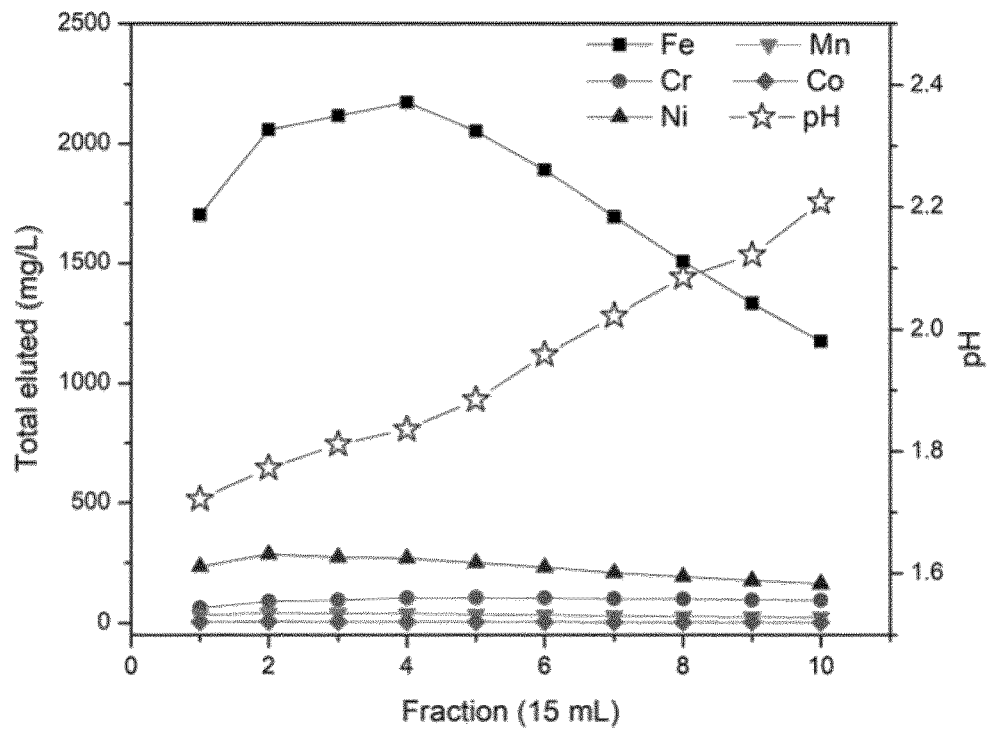
FIG. 1 is a graph showing the total amounts (in mg/L) of Fe, Cr, Ni, Co, and Mn eluted from a loaded ion-exchange resin at each 15 mL fraction using a 0.1 M $Na_2SO_4$ solution (unfiltered), with the pH of each fraction shown as well.

This describes methods to obtain radioisotopes from radiologically contaminated waste material such as spent ion exchange resin or other radiologically contaminated waste. By extracting useful radioisotopes while minimizing the overall mass of radioactive waste, these processes can offer waste minimization benefits, cost savings relative to specialized radioisotope production facilities, and a sustainable supply of isotopes for medical, industrial, and/or agricultural applications.

In some embodiments, an aqueous solution that includes one or more salts or acids can be used to extract the bound radioisotopes and convert them into a soluble species suitable for collection and/or downstream processing. For instance, mineral acids such as hydrochloric acid, nitric acid, sulfuric acid, and phosphoric acid can be employed to displace metallic cations from the ion exchange resin or other solid matrix. Organic acids—like acetic acid or citric acid—can also be used to reduce metal ion retention by promoting ion exchange reactions and/or chelation. The choice of acid or acid-salt combination can be tailored based on factors such as pH tolerance of the resin, resin selectivity for particular anions, and the overall ionic strength needed to achieve a desired level of radioisotope extraction.

In some embodiments, the methods include contacting an ion exchange resin that has been used to remove radioisotopes from nuclear process streams with an aqueous salt solution, thereby displacing and solubilizing at least a portion of the radioisotopes into the solution.

In some embodiments, varying the salt solution's concentration can affect the total fraction of radioisotopes removed. For instance, higher salt concentrations can provide more complete elution. Examples of salt solutions include sulfates, nitrates, chlorides, and/or acetates in the form of alkali metal salts. This contact can be performed in batch mode—by mixing the ion exchange resin in a vessel with the solution—or it can be performed in a column where the solution passes through the resin bed at a suitable flow rate. Eluant fractions containing the radioisotopes can then be collected.

Concentrating the radioisotopes in eluant volumes allows subsequent processing steps—such as filtration, precipitation, or further ion exchange—to separate and purify the radioisotopes of interest. The spent resin, now significantly depleted of its radioactivity, can be reclassified as a lower category of radioactive waste.

In some embodiments, the methods include isolating particular radioisotopes from mixed bed ion exchange resin. The resin can be separated into its anion and cation components, with some radioisotopes residing primarily on the anion resin while others reside primarily on the cation resin.

In some embodiments, C-14 in the form of bicarbonate anions can be enriched in the anion resin, while metal radioisotopes (like cobalt, nickel, and/or cesium) can be enriched in the cation resin. By separating these components, specialized treatments can be employed to recover C-14 from the anion resin. For example, heating and/or acidifying the anion resin can drive off carbon dioxide gas that contains C-14, which can be captured in a scrubber. This capture produces a stream that is enriched in C-14, facilitating preparation of C-14 carbonate powders used as chemical precursors or for isotopic enrichment. Alternatively, a mild salt solution can be used to elute bicarbonate ions, thereby releasing C-14 in the aqueous phase.

In some variations, the methods can include pretreating the spent ion exchange resin to remove debris or fines to provide more predictable separation and mass transfer. The resin can be dried, slurried, or simply loaded free-flowing into the contact apparatus. In batch processes, mixing and contact time can be selected to achieve a desired level of isotope removal. In continuous processes, flow rates can be chosen based on bed volumes per hour to balance throughput and elution efficiency.

These methods can also accommodate thermal or chemical volume reduction of the depleted resin. By removing targeted radioisotopes prior to incineration, pyrolysis, or other mass-reducing operations, issues such as re-volatilization or exceeding certain waste acceptance criteria can be mitigated. This is particularly relevant for isotopes like C-14, which would otherwise be prone to escape as gaseous byproducts if the resin is treated thermally without prior extraction steps.

Certain embodiments can allow for isolating multiple isotopes in separate fractions under carefully staged elution conditions. For example, one fraction can include radioisotopes such as cesium and strontium, while another may include transition metal radioisotopes like Co-60, Ni-63, and/or Mn-54. Adjusting the salt type and concentration, as well as the pH, can help achieve selective separation. Additional polishing steps—such as resin polishing, solvent extraction, electrolysis, and/or chemical precipitation—can provide further purification of the recovered isotopes.

C-14 extraction can be enhanced by exploiting the normally low selectivity resins exhibit toward bicarbonate anions. A dilute salt solution can displace bicarbonate in a concentrated eluent fraction that is subsequently acidified to release carbon dioxide. Scrubbing or precipitating the carbon dioxide can yield a dry carbonate, such as calcium carbonate or barium carbonate. This carbonate can be handled or stored as a solid, or it can be further processed into organic molecules or other specialized forms containing C-14.

The subject matter can be applied to various nuclear sources. Examples include spent ion exchange resins from power plants, research reactors, medical isotope production, nuclear-fuel reprocessing, or laboratory-scale experiments.

A range of operating parameters can be selected based on practical aims. For instance, the contact temperature can be near ambient to avoid thermal degradation of resin components, though higher-temperature treatments are feasible if the resin is robust and the process design permits it. Contact pressures typically remain near atmospheric levels for simplicity, but elevated pressures can be used in closed-loop systems that incorporate supercritical fluids or pressurized solutions. Residence times are often on the order of minutes to hours, but can be adjusted according to resin properties, solution flow rates, and the level of isotopic recovery desired.

In some approaches, partial or staged elution can be carried out so that certain isotopes are first stripped at a relatively mild salt concentration, leaving others on the resin. A subsequent stronger elution can then target the remaining isotopes. This multi-step extraction can yield two or more enriched fractions, each enriched in different sets of isotopes. Alternatively, one strong elution can be performed to remove substantially all isotopes, simplifying the process at the expense of lower selectivity.

Downstream processing of each collected fraction can include separating dissolved or colloidal solids via filtration or settling, adjusting the pH to precipitate insoluble species, and concentrating the resultant precipitates for packaging. Additional separation techniques (e.g., specialized columns, selective chelating agents, or fractional crystallization) can further refine or enrich the isotopes. The purified or partially purified isotopes can be transformed into sealed sources, radiopharmaceutical precursors, or other forms suitable for industrial research.

In all variations, the processes can be adapted to different plant scales, from small laboratory operations that handle test batches to large industrial-scale systems continuously processing high volumes of spent resin. Since the extracted isotopes can have commercial, scientific, or medical value, the methods can enable cost offset or generate direct revenue, while also reducing the waste's radioactivity to levels suitable for less stringent disposal routes.

Overall, these methods enable the economical extraction of radioisotopes from nuclear waste streams, thereby addressing problems associated with increased disposal costs, constrained disposal capacities, and the need for a stable supply of critical isotopes. By providing viable ways to recycle the resin and/or concentrate the isotopes into manageable fractions, the methods can help manage resources more sustainably and lower the lifecycle costs of nuclear technologies.

EXAMPLES

The following examples are provided to further illustrate the disclosed subject matter. They should not be used to constrict or limit the scope of the claims in any way.

Example 1

This example describes a method for selectively extracting C-14 from a spent ion exchange resin.

The method begins by slurrying a spent ion exchange resin into a separation unit. The resin is then backwashed to remove any fines and classify the bed. This results in gravity separation of the anion resin components from the cation resin components. The anion resin, which contains the vast majority of the C-14 as bicarbonate anions ($HCO_3^-$), is selected and sluiced to a separate vessel. The cation resin, which contains the vast majority of the other radioisotopes, is retained in the original separation unit.

The isolated anion exchange resin is then treated to release the bicarbonate anions. This is accomplished via thermal treatment at temperatures below 200° C. or acid treatment using an organic or inorganic acid. Both treatments release the C-14 as $CO_2$ gas. The released $CO_2$ is absorbed using either a dry scrubber, such as soda lime or $Ba(OH)_2$ pellets, or a wet scrubber, such as a NaOH solution or a $Ca(OH)_2$ slurry. The scrubbing step further purifies the C-14 since other anionic isotopes are not released as a gas and therefore remain in solution or on the resin.

Additional processing of the scrubber solution yields the C-14 as a dry powder, such as $BaCO_3$ or $CaCO_3$. For example, the C-14 carbonate solutions can be contacted with a soluble salt of calcium or barium to precipitate the C-14 as the corresponding carbonate. This precipitate can then be filtered and dried to yield $CaCO_3$ and/or $BaCO_3$ powders containing the recovered C-14. This powder can serve as a precursor for C-14 isotopic enrichment or be used to manufacture C-14 chemicals.

The original anion exchange resin, now depleted of the majority of its C-14 content, can be volume reduced using techniques such as pyrolysis or vitrification without risk of the C-14 volatilizing and contaminating the off-gas (or other gaseous or liquid waste streams) or increasing the C-14 concentration in the final waste form above disposal limits.

Example 2

This example is the same as Example 1 except instead of treating the anion resin with a thermal or acid treatment, the anion resin is treated with a dilute salt solution to selectively elute the bicarbonate anions from the resin. This takes advantage of the relatively low selectivity anion exchange resins have for bicarbonate compared to other anions like sulfate and nitrate. The bicarbonate is eluted in a small, concentrated fraction of the total eluate volume. This fraction is then treated to release the C-14 as $CO_2$ gas using the same methods described in Example 1. This provides additional purification of the C-14 from other components beyond what is achieved by the initial isolation of the anion resin.

Example 3

In this example, mixed bed spent ion exchange resins from various sources and carrying a diverse range of radioisotopes were treated with nitrate and sulfate solutions to examine the effectiveness of isotope elution. Samples were analyzed before and after treatment. The pre/post treatment isotope analysis was conducted by a commercial laboratory.

The following tables show the elution of the radioisotopes with respect to solution concentration and composition. Elution of the isotopes are shown by the activity reduction in treated resin samples vs untreated samples. The abbreviation "ND" in the tables means the presence of the indicated isotope was not detected.

Four samples were tested, two with sodium nitrate and two with sodium sulfate. The testing process began by air drying each resin sample for 4 hours. After drying, 1 gm of dried resin was added to 40 mL of the treatment solution and allowed to sit for 4 hours. After 4 hours, the resin was recovered from the solution and rinsed with 10 mL of deionized water. The sample was dried using the same procedure above, and 0.5 grams was packaged and sent to the commercial laboratory for analysis.

TABLE 1

Isotopes Eluted from Ion Exchange Resin with Nitrate Solution at 85 g/L Resin Sample 1; Sodium Nitrate Solution (85 g/L)

| | Untreated | | Treated | Activity |
|---|---|---|---|---|
| Isotope | Activity (pCi/g) | Isotope | Activity (pCi/g) | Decrease (%) |
| Sb-125 | 5.81E+04 | Sb-125 | 3.84E+04 | 34.42 |
| Ba-133 | 5.96E+03 | Ba-133 | ND | * |
| Cs-134 | 4.43E+04 | Cs-134 | ND | * |
| Cs-137 | 1.26E+05 | Cs-137 | 5.41E+02 | 98.63 |
| Co-57 | 2.12E+04 | Co-57 | 2.75E+03 | 72.64 |
| Co-58 | 2.76E+03 | Co-58 | ND | * |
| Co-60 | 1.71E+06 | Co-60 | 2.83E+05 | 68.25 |
| Mn-54 | 7.94E+05 | Mn-54 | 1.84E+04 | 96.59 |
| Sn-113 | 1.37E+03 | Sn-113 | 2.94E+03 | * |
| Ni-63 | 3.48E+06 | Ni-63 | 2.79E+05 | 77.04 |

TABLE 2

Isotopes Eluted from Ion Exchange Resin with Nitrate Solution at 8.5 g/L Resin Sample 2; Sodium Nitrate Solution (8.5 g/L)

| | Untreated | | Treated | Activity |
|---|---|---|---|---|
| Isotope | Activity (pCi/g) | Isotope | Activity (pCi/g) | Decrease (%) |
| Sb-124 | 6.04E+05 | Sb-124 | 1.78E+05 | 70.53 |
| Sb-125 | 1.13E+05 | Sb-125 | 3.46E+04 | 69.38 |
| Cs-137 | 7.18E+05 | Cs-137 | 1.92E+05 | 73.26 |
| Co-58 | 4.77E+03 | Co-58 | ND | * |
| Co-60 | 1.06E+06 | Co-60 | 6.75E+05 | 36.32 |
| Mn-54 | 3.96E+04 | Mn-54 | 2.15E+04 | 45.71 |
| Nb-95 | 1.79E+04 | Nb-95 | 9.93E+03 | 44.53 |
| Tb-160 | 8.40E+04 | Tb-160 | 5.15E+04 | 38.69 |
| Sn-113 | 1.57E+04 | Sn-113 | 8.40E+03 | 46.50 |
| Zn-65 | 2.50E+04 | Zn-65 | ND | * |
| Zr-95 | 1.44E+04 | Zr-95 | ND | * |
| C-14 | 1.30E+08 | C-14 | 4.44E+06 | 96.58 |
| Ni-63 | 2.73E+06 | Ni-63 | 4.23E+05 | 84.51 |

TABLE 3

Isotopes Eluted from Ion Exchange Resin with Sulfate Solution 142 g/L Resin Sample 3; Sodium Sulfate Solution (142 g/L)

| | Untreated | | Treated | Activity |
|---|---|---|---|---|
| Isotope | Activity (pCi/g) | Isotope | Activity (pCi/g) | Decrease (%) |
| Sr-90 | 2.48E+03 | Sr-90 | 1.39E+02 | 94.40 |
| Cs-137 | 5.87E+05 | Cs-137 | 2.87E+04 | 95.11 |
| Co-60 | 4.69E+05 | Co-60 | 1.01E+05 | 78.46 |
| Ni-63 | 3.33E+05 | Ni-63 | 6.01E+04 | 81.95 |
| C-14 | 1.16E+05 | C-14 | 1.85E+04 | 84.05 |

TABLE 4

Isotopes Eluted from Ion Exchange Resin with Sulfate Solution 14.2 g/L Resin Sample 3; Sodium Sulfate Solution (14.2 g/L)

| | Untreated | | Treated | Activity |
|---|---|---|---|---|
| Isotope | Activity (pCi/g) | Isotope | Activity (pCi/g) | Decrease (%) |
| Sr-90 | 2.48E+03 | Sr-90 | 1.59E+03 | 35.89 |
| Cs-137 | 5.87E+05 | Cs-137 | 4.30E+05 | 26.75 |
| Co-60 | 4.69E+05 | Co-60 | 2.93E+05 | 37.53 |
| Ni-63 | 3.33E+05 | Ni-63 | 1.45E+05 | 56.46 |
| C-14 | 1.16E+05 | C-14 | 1.58E+04 | 86.38 |

The data from the tables show that both the sulfate and nitrate solutions are effective for the elution of radioisotopes. The activity reductions shown in the tables, indicate that significant quantities of the isotopes are removed from the resin. The removal of such quantities of isotopes substantially eases the disposal requirements of the treated waste resins and allows for the recycle of the removed isotopes. The data also indicate that solution concentration can be adjusted to maximize removal of isotopes while minimizing secondary waste with respect to specific characterization of the waste resin.

Example 4

This process is similar to the process described in Example 3 except the process is operated continuously instead of as a batch. A sample of spent resin is placed into an ion exchange column. The eluting solution is passed through the column in either an upflow or downflow configuration at a flow rate of between 1-20 BVs per hour (BV=Bed Volume, i.e., the volume of resin in the column). Typically, the flow rate is 2-4 BVs/hr. The effluent containing the eluted isotopes is collected and processed to isolate the isotopes of interest. The resin is optionally washed with deionized water to displace any residual salt solution prior to being sent for volume reduction.

Example 5

This example describes a method for separating radioisotopes from ion exchange resin used to process nuclear waste. The method was performed using a column setup.

A sample of 250 mL of dry cation exchange resin was loaded into a column. The resin was contacted with 2 L of a simulant solution representative of the metals found in stainless steel. This simulant solution was prepared from hydrated chloride salts. The composition of the simulant solution was verified by inductively coupled plasma optical emission spectroscopy (ICP-OES), with the results shown in Table 5.

TABLE 5

Stainless-Steel Simulant Feed Solution Composition

| Element | Concentration (mg/L) | Concentration (wt %) |
|---|---|---|
| Fe | 4410 ± 46 | 64.6 |
| Cr | 1296 ± 12 | 19.0 |
| Ni | 948 ± 7 | 13.9 |
| Mn | 152 ± 2 | 2.2 |
| Co | 19.1 ± 0.1 | 0.3 |

The simulant solution initially eluted clear and acidic until about 1.5 L had passed through the resin, after which the eluate began exhibiting a greenish color. After passing the full 2 L of simulant solution through the resin, the resin was washed with 3 L of deionized water. The loaded resin was then dried in a vacuum oven at 50° C. overnight. This resin is representative of a resin that would be obtained during the treatment of spent acids used in radioactive metal decontamination and recycling procedures.

To determine the metal loading on the resin, a 15 mL sample of the dry loaded resin, having a mass of 13.36 g, was packed into a column. The resin was stripped with 4 M HCl until the eluate came through clear, which required ten 15 mL fractions. The measured metal loadings are shown in Table 6. The total loading was 1.82 milliequivalents per milliliter (meq/mL) of wet resin, which is slightly lower than the resin's reported capacity of 1.9 meq/mL.

TABLE 6

Resin Loading Quantified by Acid Stripping (4M HCl)

| Element | Specific Loading (mg metal/g dry resin) | Specific Loading (meq/mL wet resin) |
| --- | --- | --- |
| Fe | 53 ± 1 | 1.38 ± 0.02 |
| Cr | 9.0 ± 0.1 | 0.253 ± 0.002 |
| Ni | 6.1 ± 0.1 | 0.153 ± 0.003 |
| Mn | 1.03 ± 0.03 | 0.027 ± 0.001 |
| Co | 0.120 ± 0.003 | 0.0030 ± 0.0001 |

Three subsequent column experiments were conducted to evaluate the elution behavior using $Na_2SO_4$ solutions at concentrations of 0.1 M, 0.5 M, and 1 M. Each column, packed with 15 mL dry loaded resin (24 mL wet resin), was eluted in ten successive 15 mL fractions. For the 0.1 M and 1 M experiments, eluate fractions were analyzed both unfiltered and after filtration, while only unfiltered samples were analyzed for the 0.5 M experiment. pH was recorded in each fraction.

Figure 2:
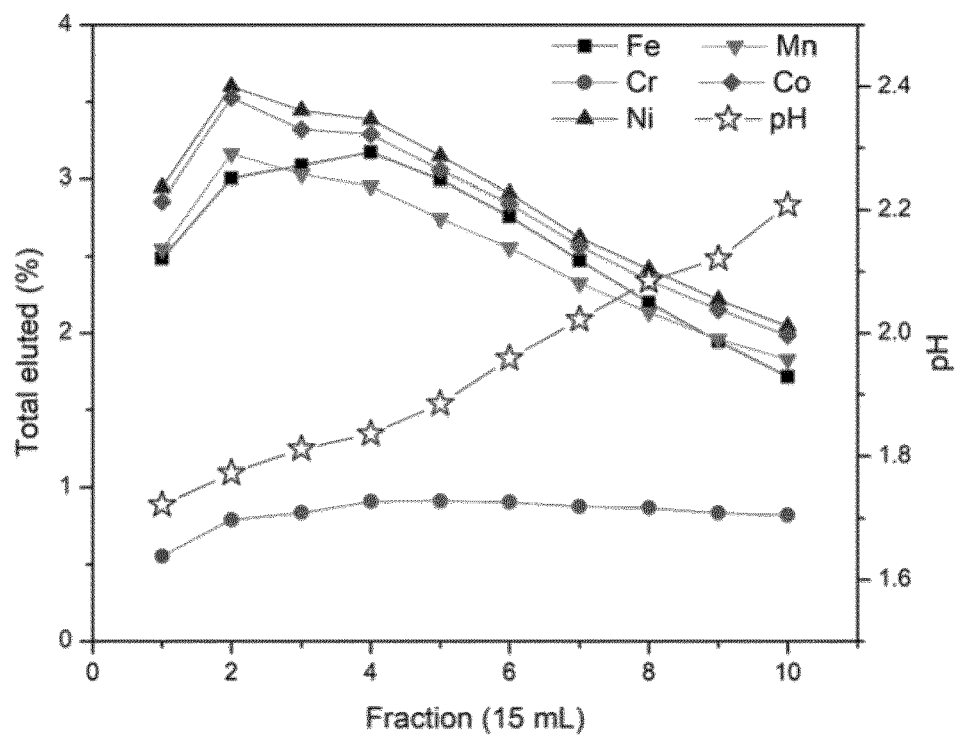
FIG. 2 is a graph showing the same 0.1 M $Na_2SO_4$ elution as FIG. 1, but with the total metals plotted as a percentage of their initial loading rather than an absolute concentration.

For the 0.1 M $Na_2SO_4$ elution, each fraction visually eluted with a similar brown-yellow-green color, indicating very little separation of the metals. This was confirmed by the ICP-OES results. Filtration did not significantly affect the results at this $Na_2SO_4$ concentration indicating the metals were present as ions and not insoluble compounds. The unfiltered results are shown in FIGS. 1-2. The metal elution reached a maximum in fraction 4, with approximately 25% of the total loading eluted for all metals except Cr, of which only 8% was eluted. The pH of the initial 0.1 M $Na_2SO_4$ solution was 7.14. The pH increased monotonically across the fractions from 1.72 to 2.21.

Figure 3:
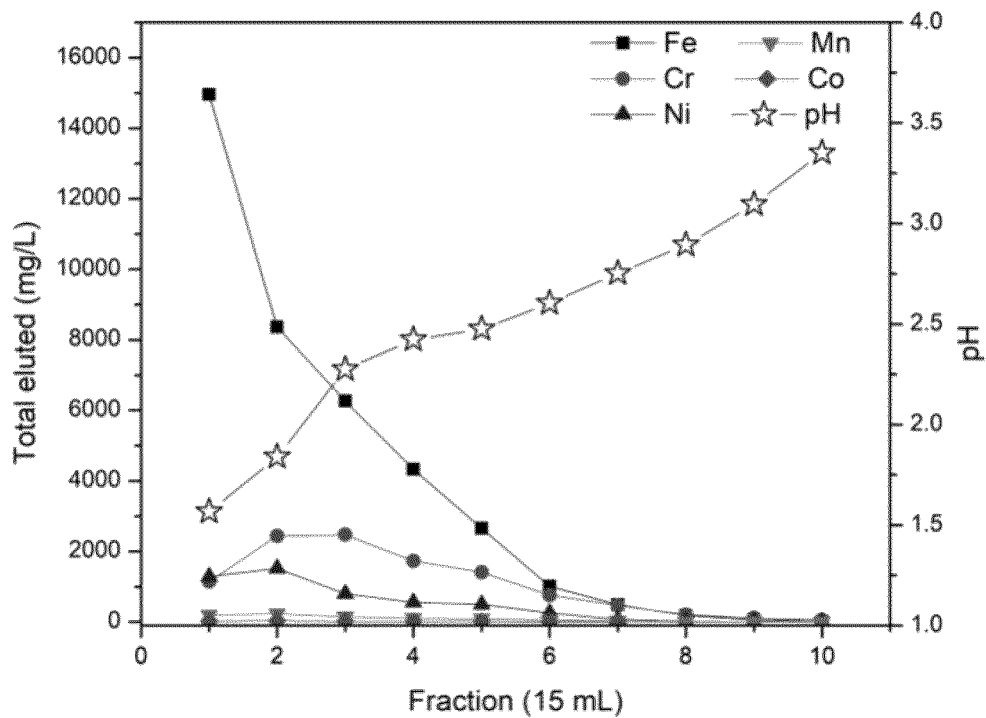
FIG. 3 is a graph illustrating the elution profile of Fe, Cr, Ni, Co, and Mn (in mg/L) from the same ion-exchange resin using a 1 M $Na_2SO_4$ solution (unfiltered) in successive 15 mL fractions, with the pH of each fraction shown as well.
Figure 4:
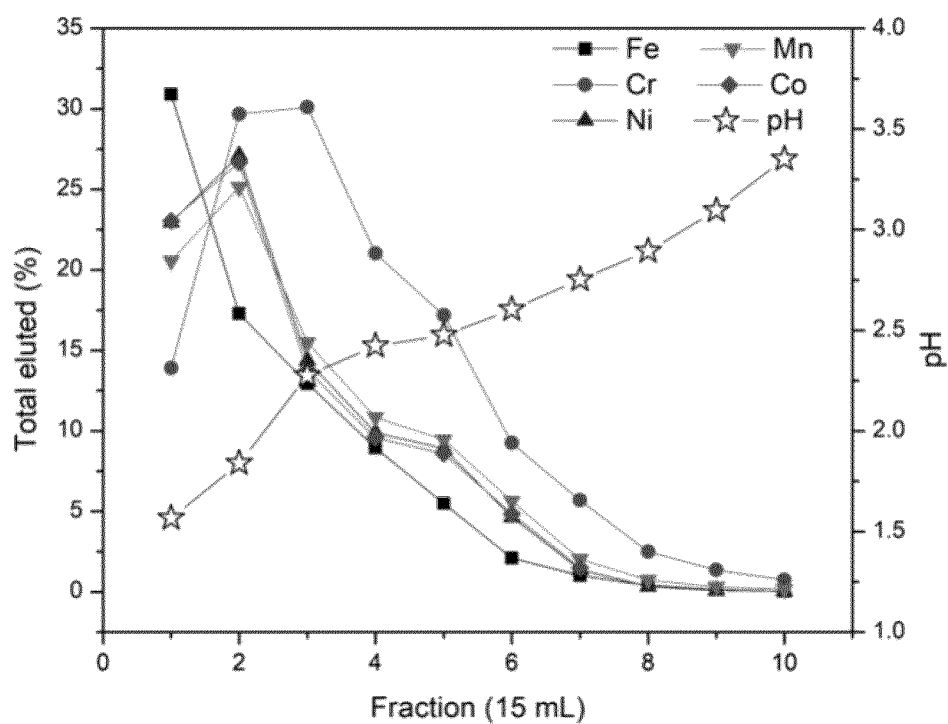
FIG. 4 is a graph showing the 1 M $Na_2SO_4$ elution as FIG. 3, but with the total metals plotted as a percentage of their initial loading.
Figure 5:
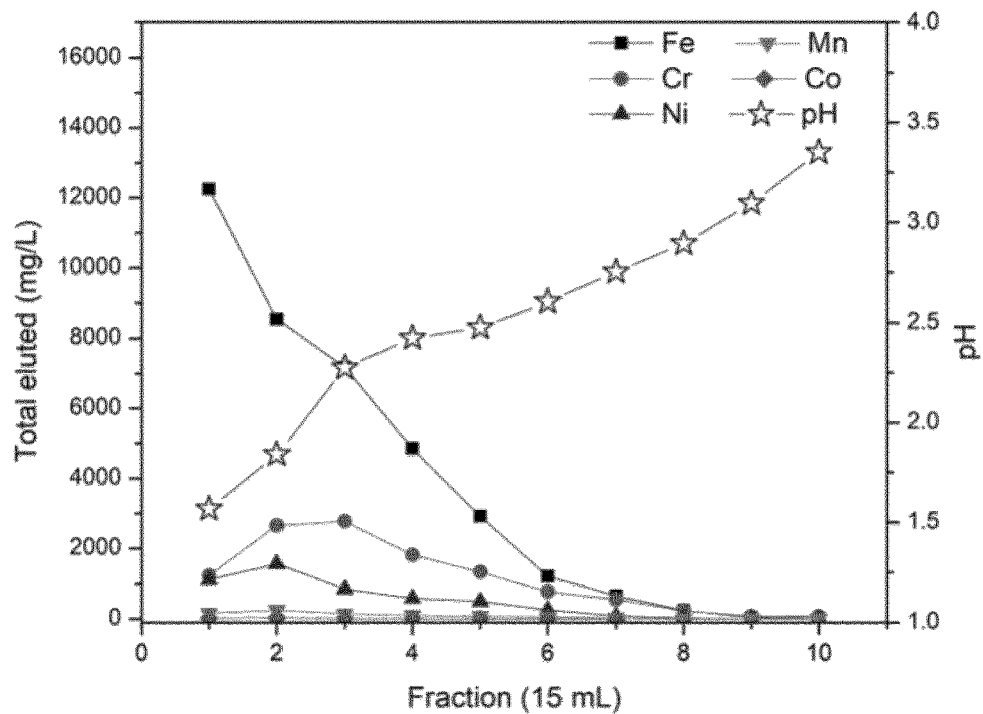
FIGS. 5-6 are graphs of the 1 M $Na_2SO_4$ resin-elution experiment, similar to FIGS. 3-4, but for filtered eluate samples, again with pH tracked for each successive fraction.
Figure 6:
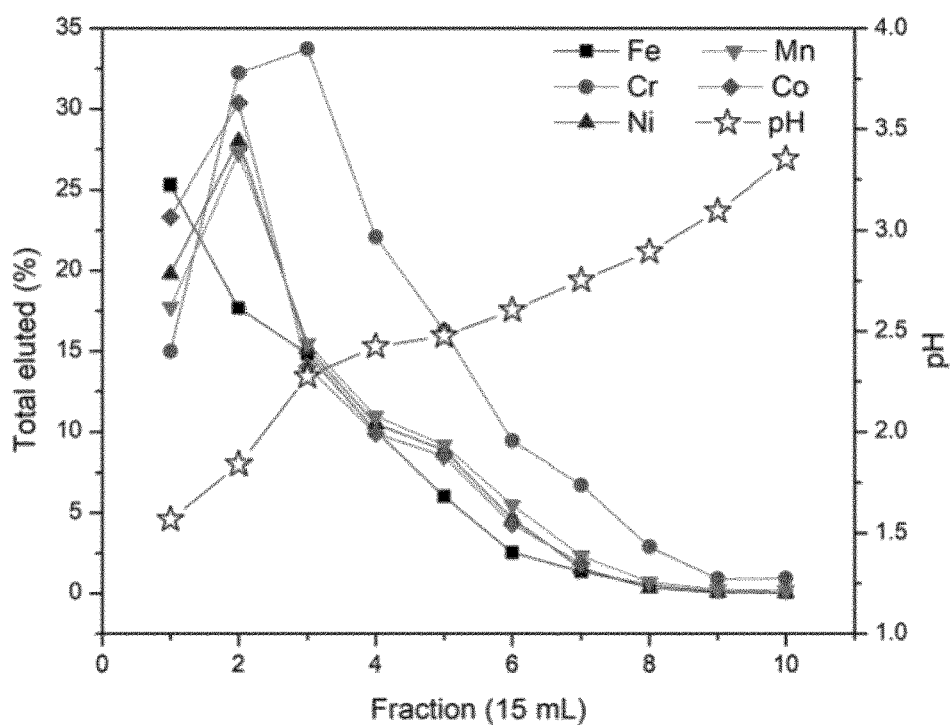

The 1 M $Na_2SO_4$ solution was able to completely strip the metals from the resin within the ten 15 mL fractions. The color of the fractions changed across the series, with fraction 1 being the most yellow-brown and subsequent fractions exhibiting various shades of blue and green until fractions 9 and 10, which eluted clear. The Fe elution was maximal in fraction 1, while the Ni, Mn, and Co concentrations peaked in fraction 2 and the Cr peaked in fraction 3. More metal eluted in the first 1 M fraction than in the entire 0.1 M $Na_2SO_4$ experiment. There were also greater differences between the unfiltered and filtered samples compared to the 0.1 M experiment. The unfiltered results are shown in FIGS. 3-4, and the filtered results are shown in FIGS. 5-6. The pH of the initial 1 M $Na_2SO_4$ solution was 6.08. The pH increased monotonically across the series from 1.57 in fraction 1 (slightly more acidic than the first 0.1 M fraction) to 3.35 in fraction 10 (10 times less acidic than the final 0.1 M fraction).

Figure 7:
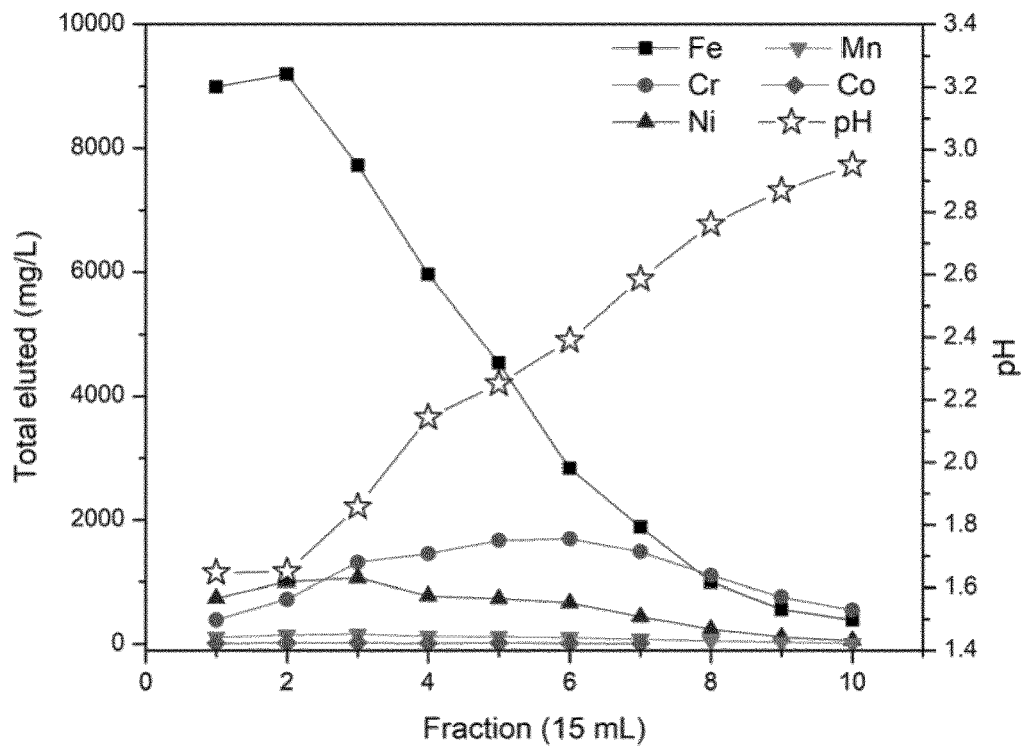
FIG. 7 is a graph depicting the total metals (in mg/L) eluted by a 0.5 M $Na_2SO_4$ solution (unfiltered) in successive 15 mL fractions, with the pH of each fraction shown as well.
Figure 8:
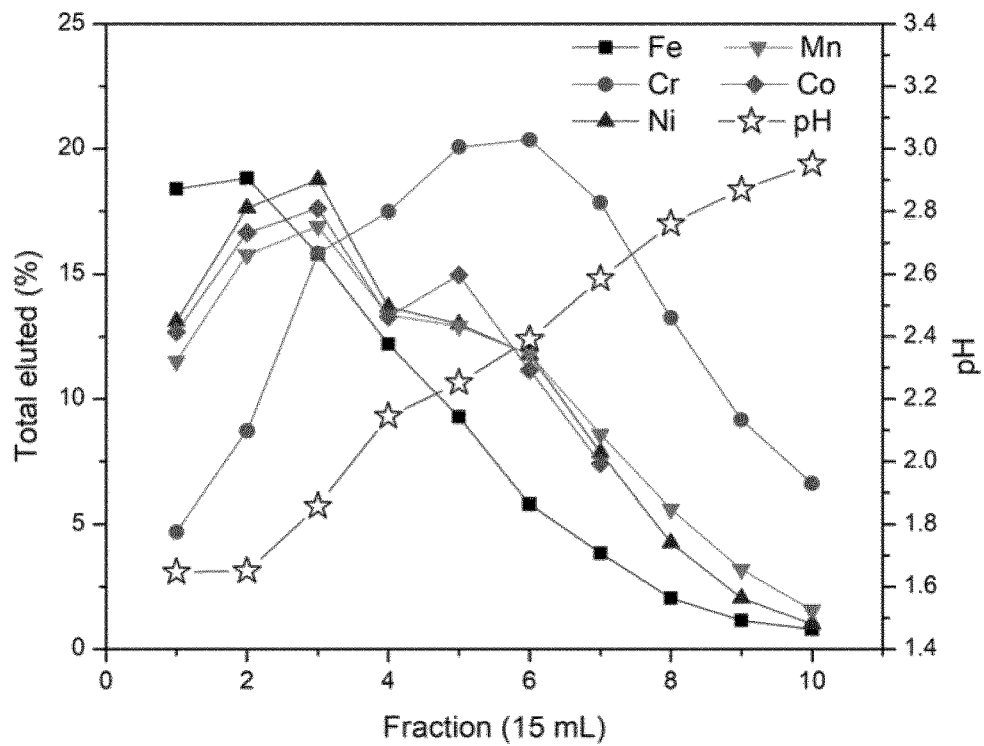
FIG. 8 is a graph showing the same 0.5 M $Na_2SO_4$ elution as FIG. 7, but with the total metals plotted as a percentage of their initial loading rather than an absolute concentration.

The 0.5 M $Na_2SO_4$ elution experiment proceeded similarly to the 1 M experiment but did not fully strip the resin. Only the unfiltered fractions were analyzed, with the results shown in FIGS. 7-8. The first few fractions eluted with an amber color that transitioned to various shades of blue-green, with the final fractions being a grey-green color. The Fe elution peaked in fraction 2. However, unlike the 1 M experiment, the Cr and Ni did not peak in the same fraction as each other, with the maximum Cr elution occurring in fraction 6 and the Ni elution peaking in fraction 3. The pH of the initial 0.5 M $Na_2SO_4$ solution was 6.10. The pH increased monotonically across the series from 1.65 in fraction 1 (more acidic than the 0.1 M experiment but less acidic than the 1 M experiment) to 2.95 in fraction 10 (less acidic than the final 0.1 M fraction but more acidic than the final 1 M fraction).

The overall elution results for each $Na_2SO_4$ concentration, with and without filtration, are summarized in Table 7 as the percentage of each metal eluted relative to the initial loading. The 1 M $Na_2SO_4$ solution provided the highest elution, with >100% elution observed for Cr. The 0.5 M solution provided the next highest elution, followed by the 0.1 M solution. Filtration had little effect on the overall elution percentages.

TABLE 7

Cumulative Elution Efficiency (% of Loading)

| Element | 0.1M $Na_2SO_4$ (Unfiltered) | 0.1M $Na_2SO_4$ (Filtered) | 0.5M $Na_2SO_4$ (Unfiltered) | 1M $Na_2SO_4$ (Unfiltered) | 1M $Na_2SO_4$ (Filtered) |
| --- | --- | --- | --- | --- | --- |
| Fe | 26 ± 4% | 25 ± 5% | 88 ± 8% | 79 ± 8% | 78 ± 9% |
| Cr | 8 ± 3% | 8 ± 4% | 134 ± 4% | 131 ± 8% | 140 ± 9% |
| Ni | 29 ± 3% | 29 ± 3% | 103 ± 5% | 90 ± 7% | 89 ± 11% |
| Mn | 25 ± 4% | 25 ± 4% | 101 ± 3% | 90 ± 4% | 90 ± 4% |
| Co | 28 ± 4% | 27 ± 4% | 94 ± 3% | 88 ± 4% | 92 ± 5% |

This demonstrates that radioisotopes can be separated from ion exchange resin used to process nuclear waste by eluting the resin with $Na_2SO_4$ solutions. The concentration of the $Na_2SO_4$ solution affects the degree of separation and the overall elution of the radioisotopes from the resin. A 1 M $Na_2SO_4$ solution was able to completely strip the resin, while 0.1 M and 0.5 M solutions provided only partial elution. The pH of the eluted fractions depended on the $Na_2SO_4$ concentration and increased across the series of fractions for each concentration. These results indicate that the $Na_2SO_4$ concentration and pH can be varied to provide selective elution and separation of radioisotopes from spent ion exchange resins.

Example 6

This example describes a method for separating radioisotopes from cation exchange resin used to process nuclear waste from a nuclear power plant. The method was performed using a column setup.

A sample of 30 mL of the cation exchange resin was washed with deionized water in a beaker to remove fines and then slurried into an ion exchange column. A sodium sulfate solution, at either 0.5 M or 1 M concentration, was passed through the resin in an upflow configuration at a flow rate of 60 mL/hour (2 bed volumes per hour). A total of 300 mL of the sodium sulfate solution was passed through the resin.

After displacing the water used for preparing the column, the sodium sulfate solution exiting the column was collected in 30 mL aliquots. Each aliquot was analyzed for metals content using inductively coupled plasma atomic emission spectroscopy (ICP-AES), pH, approximate dose rate at contact, and radioisotope content. Fresh resin samples were used for each experiment at the two different sodium sulfate concentrations. The results were compared to determine the relative efficiency of the 0.5 M and 1 M sodium sulfate solutions at removing the radioactivity from the resin.

Figure 9:
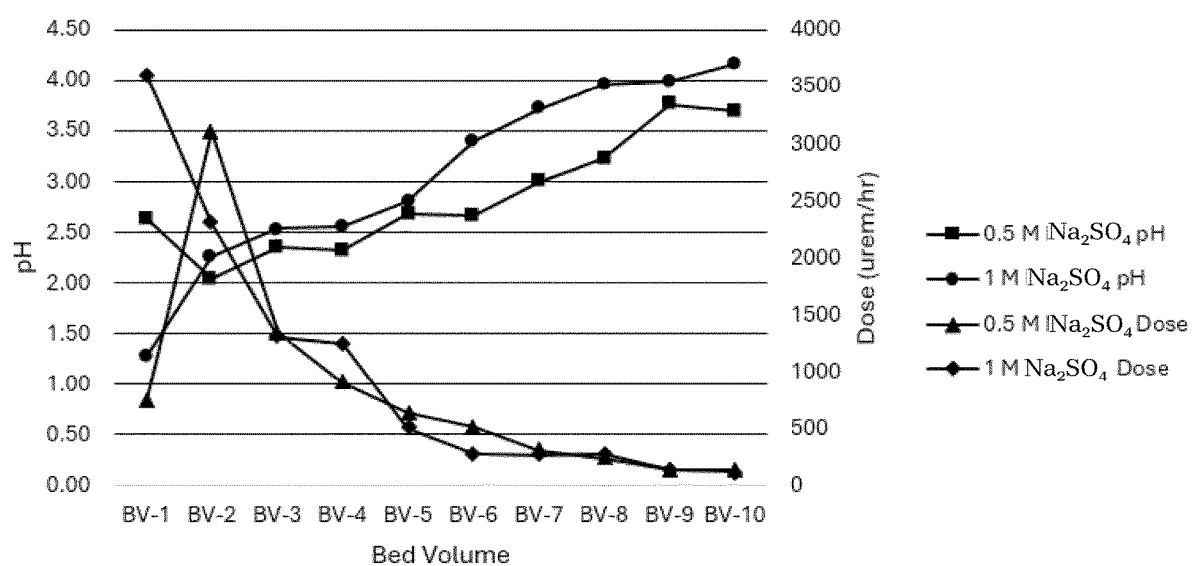
FIG. 9 is a graph showing pH and measured dose rate (on separate axes) as a function of bed volumes passed through a cation-exchange column for both 0.5 M and 1 M $Na_2SO_4$ solutions, illustrating the reduction in radioactivity over successive bed volumes.

The dose rate of the ion exchange column after passage of both the 0.5 M and 1 M sodium sulfate solutions was close to background, indicating the transfer of the bulk of the radioactivity from the solid resin to the aqueous phase. FIG. 9 shows the pH and dose rate measured at contact with the vial containing each 30 mL aliquot.

From the data in FIG. 9, it can be seen that the bulk of the gross radioactivity was removed by both the 0.5 M and 1 M sodium sulfate solutions after 10 bed volumes had been passed through the resin. The majority of the dose reduction occurred after 7 bed volumes of the sodium sulfate solution had passed through the resin. The main radioisotopes present in the resin were Cs-137, Co-60, Ni-63 and Sr-90, which were primarily responsible for the measured dose rates.

The pH of both the 0.5 M and 1 M sodium sulfate solutions was initially acidic, resulting from the displacement of residual protons from the cation exchange resin. The pH climbed steadily during the course of the experiment, as would be expected. The dose rate of the aliquots was highest in the first bed volume for the 1 M sodium sulfate solution and in the second bed volume for the 0.5 M sodium sulfate solution. This indicates a greater efficiency of radioactivity removal from the resin for the more concentrated 1 M sodium sulfate solution.

Table 8 shows the concentrations of strontium, iron, manganese, chromium, nickel and cobalt measured in the ten 30 mL aliquots collected from passing the 0.5 M sodium sulfate solution through the resin, as determined by ICP-AES. The peak concentrations for each metal occurred in either the second or third bed volume, which correlates well with the measured dose rate of each aliquot shown in FIG. 9. The concentrations of metals in the last two bed volumes were very low for all the metals analyzed, indicating that the vast majority of the metals and radioactive isotopes had been eluted from the resin.

TABLE 8

Metal Concentrations in 0.5M $Na_2SO_4$ Eluate (ppm)

| Bed Vol. | Co | Cr | Fe | Mn | Ni | Sr |
| --- | --- | --- | --- | --- | --- | --- |
| BV1 | 0.0568 | 0.0555 | 13.4 | 5.53 | 0.134 | 0.210 |
| BV2 | 0.218 | 0.207 | 77.4 | 29.2 | 3.34 | 0.939 |
| BV3 | 0.0856 | 0.0834 | 22.4 | 13.4 | 1.39 | 1.19 |
| BV4 | 0.0534 | 0.0560 | 15.0 | 8.39 | 0.849 | 0.947 |
| BV5 | 0.0348 | 0.0380 | 10.3 | 5.38 | 0.532 | 0.731 |
| BV6 | 0.0289 | 0.0321 | 8.55 | 4.31 | 0.430 | 0.597 |
| BV7 | 0.0136 | 0.0173 | 4.38 | 1.85 | 0.184 | 0.333 |
| BV8 | 0.00930 | 0.0111 | 2.93 | 1.03 | 0.0932 | 0.227 |
| BV9 | 0.00400 | 0.00200 | 0.834 | 0.0601 | 0.00690 | 0.0431 |
| BV10 | 0.00350 | 0.00270 | 0.536 | 0.0193 | 0.00460 | 0.00620 |

Table 9 and Table 10 show the elution profiles of specific radioisotopes from the cation exchange resin during treatment with either 0.5 M or 1 M sodium sulfate solutions. The radioisotopes analyzed include Sr-90, Co-60, Ni-63, Cs-137, C-14, Co-58, and Mn-54. The data is presented as the activity of each radioisotope (in units of pCi/L) in each of the ten 30 mL aliquots (bed volumes) of eluate collected during the experiment.

TABLE 9

Radioisotope Activity in 0.5M $Na_2SO_4$ Eluate (pCi/L)

| Bed Vol. | Sr-90 | Co-60 | Ni-63 | Cs-137 | C-14 | Co-58 | Mn-54 |
| --- | --- | --- | --- | --- | --- | --- | --- |
| BV1 | 3970 | 20200000 | 1160000 | 536000 | 19600 | 0 | 112000 |
| BV2 | 7630 | 96600000 | 1860000 | 1120000 | 3000 | 236000 | 5320000 |
| BV3 | 19300 | 37600000 | 706000 | 1110000 | 0 | 0 | 2500000 |
| BV4 | 8510 | 23500000 | 394000 | 691000 | 2870 | 0 | 1580000 |
| BV5 | 9780 | 16800000 | 244000 | 447000 | 0 | 0 | 1180000 |
| BV6 | 7510 | 12000000 | 207000 | 298000 | 0 | 0 | 819000 |
| BV7 | 4010 | 5110000 | 78600 | 146000 | 1340 | 0 | 346000 |
| BV8 | 2110 | 2920000 | 43900 | 65300 | 0 | 0 | 211000 |
| BV9 | 612 | 131000 | 3000 | 0 | 0 | 0 | 15000 |
| BV10 | 139 | 72300 | 2190 | 0 | 0 | 0 | 6530 |

TABLE 10

Radioisotope Activity in 1M $Na_2SO_4$ Eluate (pCi/L)

| Bed Vol. | Sr-90 | Co-60 | Ni-63 | Cs-137 | C-14 | Co-58 | Mn-54 |
| --- | --- | --- | --- | --- | --- | --- | --- |
| BV1 | 22200 | 110000000 | 2370000 | 1720000 | 7260 | 192000 | 5920000 |
| BV2 | 28300 | 62900000 | 1140000 | 1920000 | 2200 | 0 | 3910000 |

TABLE 10-continued

| | Radioisotope Activity in 1M $Na_2SO_4$ Eluate (pCi/L) | | | | | | |
|---|---|---|---|---|---|---|---|
| Bed Vol. | Sr-90 | Co-60 | Ni-63 | Cs-137 | C-14 | Co-58 | Mn-54 |
| BV3 | 16000 | 35700000 | 649000 | 1040000 | 1390 | 0 | 2330000 |
| BV4 | 13800 | 34500000 | 666000 | 1050000 | 0 | 0 | 2170000 |
| BV5 | 3100 | 12500000 | 213000 | 309000 | 0 | 0 | 799000 |
| BV6 | 256 | 231000 | 5540 | 0 | 0 | 0 | 28100 |
| BV7 | 68 | 101000 | 12000 | 0 | 0 | 0 | 9470 |
| BV8 | 95 | 72000 | 2790 | 0 | 0 | 0 | 6410 |
| BV9 | 0 | 45600 | 2150 | 0 | 0 | 0 | 5720 |
| BV10 | 0 | 37200 | 1830 | 0 | 0 | 0 | 3840 |

For the 0.5 M sodium sulfate treatment, the radioisotope elution profiles generally show a peak in activity in the second or third bed volume, consistent with the dose rate measurements and metal concentrations. Co-60 and Cs-137 exhibited the highest activities in the eluate, peaking at $9.66 \times 10^7$ pCi/L and $1.12 \times 10^6$ pCi/L, respectively, in the second bed volume. Mn-54 and Ni-63 also showed significant elution, with peak activities of $5.32 \times 10^6$ pCi/L (second bed volume) and $1.86 \times 10^6$ pCi/L (second bed volume), respectively. Sr-90, C-14, and Co-58 were detected at lower activities in the eluate. By the tenth bed volume, the activities of all radioisotopes had decreased by several orders of magnitude compared to their peak values, indicating that the majority of the radioactivity had been removed from the resin.

The 1 M sodium sulfate treatment showed a similar overall elution pattern, with most radioisotopes peaking in activity within the first four bed volumes. However, the peak activities were generally higher and occurred earlier compared to the 0.5 M treatment. For example, Co-60 reached a maximum activity of $1.10 \times 10^8$ pCi/L in the first bed volume, while Cs-137 peaked at $1.92 \times 10^6$ pCi/L in the second bed volume. The elution of Sr-90, Ni-63, Mn-54, and C-14 also shifted towards earlier bed volumes and exhibited higher peak activities in the 1 M treatment compared to the 0.5 M treatment. As with the 0.5 M treatment, the radioisotope activities in the eluate decreased rapidly after the initial peak, with most falling below detectable levels by the sixth bed volume.

This example demonstrated that radioisotopes can be efficiently separated from spent cation exchange resin used to process nuclear waste by eluting the resin with sodium sulfate solutions. Both 0.5 M and 1 M sodium sulfate solutions were effective at removing the bulk of the radioactivity from the resin, with the 1 M solution showing slightly higher elution efficiency. The radioisotopes were concentrated in the first few bed volumes of eluate, allowing them to be collected in a small volume for further processing and purification. The concentrations of metal ions in the eluate fractions tracked closely with the radioactivity levels. After treatment with the sodium sulfate solutions, the spent resin had a greatly reduced radioactivity level, likely allowing for its disposal as low-level waste.

Example 7

This example describes processes to separate and/or recover radioisotopes from the eluate obtained in the above examples. This can include techniques such as ion exchange, solvent extraction, precipitation, and electrochemical methods. This also includes any of the methods described in the incorporated documents (e.g., the description of the '807 Int'l App. at paragraphs [0013], [0021], [0023], [0040], and the like).

Illustrative Embodiments

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A method of separating C-14 from ion exchange resin used to process nuclear waste, the method comprising any combination of one or more of the following: separating anion resin components in the ion exchange resin from cation resin components in the ion exchange resin; and treating the anion resin components to release the C-14 as carbon dioxide gas.

P2. The method of P1 comprising: capturing the carbon dioxide gas with a scrubber to obtain a captured carbon dioxide fraction; and purifying the captured carbon dioxide fraction to form a C-14 product having an increased concentration of C-14 compared to the captured carbon dioxide fraction.

P3. The method of P2 wherein the scrubber comprises a dry scrubber including soda lime and/or $Ba(OH)_2$.

P4. The method of any one of P2-P3 wherein the scrubber comprises a wet scrubber including a solution or slurry comprising NaOH and/or $Ca(OH)_2$.

P5. The method of any one of P2-P4 wherein the C-14 product is a dry powder comprising $BaCO_3$ and/or $CaCO_3$.

P6. The method of any one of P1-P5 wherein treating the anion resin components comprises heating the anion resin components to a temperature below 200° C. and/or mixing the anion resin components with an acid.

P7. The method of any one of P1-P6 wherein treating the anion resin components comprises eluting bicarbonate anions in the anion resin components with a dilute salt solution.

P8. The method of any one of P1-P7 wherein separating the anion resin components from the cation resin components comprises gravity separating the anion resin components from the cation resin components.

P9. The method of any one of P1-P8 wherein the anion resin components include a majority of the C-14 in the ion exchange resin as bicarbonate anions ($HCO_3^-$).

P10. The method of any one of P1-P9 wherein the cation resin components include a majority of radioisotopes other than C-14 in the ion exchange resin.

P11. The method of any one of P1-P10 comprising reducing the volume of the anion resin components after treating the anion resin components to release the C-14.

P12. A method of separating radioisotopes from ion exchange resin used to process nuclear waste, the method comprising any combination of one or more of the following: combining the ion exchange resin and an aqueous solution including a metal salt to form a mixture; and separating the ion exchange resin from the mixture to form an enriched solution; wherein the enriched solution includes at least 20% of the activity of at least one of the radioisotopes (up to and including all the radioisotopes) in the ion exchange resin.

P13. The method of P12 wherein the enriched solution includes 20-100% of the activity of at least one of the radioisotopes (up to and including all the radioisotopes) in the ion exchange resin.

P14. The method of P13 wherein the enriched solution includes 20-100% of the activity of Ba-133, C-14, Co-57, Co-58, Co-60, Cs-134, Cs-137, I-129, Mn-54, Nb-95, Ni-63, Sb-124, Sb-125, Sn-113, Sr-90, Tb-160, Zn-65, and/or Zr-95.

P15. The method of any one of P12-P14 wherein the aqueous solution comprises 2-500 g/L of the metal salt.

P16. The method of any one of P12-P15 wherein the metal salt comprises a nitrate salt (e.g., $NaNO_3$) and/or a sulfate salt (e.g., $Na_2SO_4$).

P17. The method of any one of P12-P16 wherein combining the ion exchange resin and the aqueous solution comprises: drying the ion exchange resin to form a dried ion exchange resin; and combining the dried ion exchange resin with the aqueous solution to form the mixture.

P18. The method of P17 wherein the dried ion exchange resin is added to the aqueous solution at a ratio of about 1:1 g of the dried ion exchange resin per mL of the aqueous solution to about 1:100 g of the dried ion exchange resin per mL of the aqueous solution.

P19. The method of any one of P12-P18 comprising allowing the mixture to sit for at least 30 minutes before separating the ion exchange resin from the mixture.

P20. The method of any one of P12-P19 comprising allowing the mixture to sit for at least two hours before separating the ion exchange resin from the mixture.

P21. A method of separating radioisotopes from ion exchange resin used to process nuclear waste, the method comprising: contacting the ion exchange resin with an aqueous salt solution; and separating the aqueous salt solution from the ion exchange resin to form an enriched salt solution; wherein the enriched salt solution includes at least 80% of the activity of at least one of the radioisotopes in the ion exchange resin.

P22. The method of P21 wherein contacting the ion exchange resin with the aqueous salt solution and separating the aqueous salt solution from the ion exchange resin comprises eluting the radioisotopes from the ion exchange resin with the aqueous salt solution.

P23. The method of P21 wherein the ion exchange resin is a cation resin, the method comprising separating a mixed ion exchange resin into the cation resin and an anion resin.

P24. The method of P21 wherein a majority of the ion exchange resin is a cation resin.

P25. The method of P24 wherein at least 80% of the ion exchange resin is the cation resin.

P26. The method of P21 wherein the aqueous salt solution includes a sulfate salt and/or a nitrate salt.

P27. The method of P21 wherein the aqueous salt solution includes an alkali metal sulfate salt and/or an alkali metal nitrate salt.

P28. The method of P21 wherein the aqueous salt solution has at least 0.1 M salt concentration.

P29. The method of P21 wherein the aqueous salt solution has at least 0.5 M salt concentration.

P30. The method of P21 wherein the enriched salt solution includes at least 95% of the activity of Sr-90, Co-60, Ni-63, Cs-137, C-14, Co-58, and/or Mn-54 radioisotopes in the ion exchange resin.

P31. A method of separating radioisotopes from ion exchange resin used to process nuclear waste, the method comprising: contacting the ion exchange resin with an aqueous salt solution including a sulfate salt and/or a nitrate salt; and separating the aqueous salt solution from the ion exchange resin to form an enriched salt solution; wherein the enriched salt solution includes at least 80% of the activity of Sr-90, Co-60, Ni-63, Cs-137, C-14, Co-58, and/or Mn-54 radioisotopes in the ion exchange resin.

P32. The method of P31 wherein contacting the ion exchange resin with the aqueous salt solution and separating the aqueous salt solution from the ion exchange resin comprises eluting the radioisotopes from the ion exchange resin with the aqueous salt solution.

P33. The method of P32 comprising eluting no more than 10 bed volumes to produce the enriched salt solution.

P34. The method of P31 wherein the enriched salt solution includes at least 95% of the activity of Sr-90, Co-60, Ni-63, Cs-137, C-14, Co-58, and/or Mn-54 radioisotopes in the ion exchange resin.

P35. The method of P31 wherein the aqueous salt solution has at least 0.1 M salt concentration.

P36. The method of P31 wherein the aqueous salt solution has at least 0.5 M salt concentration.

P37. A method of separating C-14 from a mixed ion exchange resin used to process nuclear waste, the method comprising: separating the mixed ion exchange resin into a cation resin and an anion resin; and treating the anion resin to release the C-14 as carbon dioxide gas.

P38. The method of P37 comprising: capturing the carbon dioxide gas with a scrubber to obtain a captured carbon dioxide fraction; and purifying the captured carbon dioxide fraction to form a C-14 product having an increased concentration of C-14 compared to the captured carbon dioxide fraction.

P39. The method of P38 wherein the scrubber comprises a dry scrubber including soda lime and/or $Ba(OH)_2$.

P40. The method of P38 wherein the scrubber comprises a wet scrubber including a solution or slurry comprising NaOH and/or $Ca(OH)_2$.

General Terminology and Interpretative Conventions

Articles such as "the," "a," and "an" shall be interpreted as connoting the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group shall be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition can be based on the recited condition and one or more unrecited conditions.

The term "can," when used as an auxiliary verb, shall refer to an optional or noncompulsory capability of the described subject matter that is not required to be present in any given embodiment.

The terms have, having, contain, containing, include, including, and characterized by shall be interpreted to be synonymous with the terms comprise and comprising—i.e., the terms are inclusive or open-ended and do not exclude additional unrecited subject matter. The use of these terms shall also be understood as disclosing and providing support for narrower alternative embodiments where these terms are replaced by "consisting of," "consisting of the recited subject matter plus impurities and/or trace amounts of other materials," or "consisting essentially of."

Certain features described in the context of separate embodiments can also be implemented in combination in a single embodiment. Conversely, various features described in the context of a single embodiment can also be implemented in multiple embodiments separately or in any suitable subcombination. Moreover, although features may be described in certain combinations and even initially claimed as such, one or more features from a claimed combination can be excised from the combination, and the claimed combination may be directed to a subcombination or variation of a subcombination.

Many aspects or features are described as being optional, e.g. through the use of the term "can" or otherwise. For the sake of brevity and legibility, this document does not explicitly recite each combination and/or permutation that may be obtained by choosing from the set of optional aspects or features. However, this document is to be interpreted as explicitly disclosing all such combinations and/or permutations. For example, something described as having three optional aspects may be embodied in seven different ways, namely with only one of the three aspects, with any two of the three aspects, or with all three of the aspects.

Any methods described in this document should not be interpreted to require the steps to be performed in a specific order unless expressly stated otherwise or doing so is literally impossible. The methods should also be interpreted to provide support to perform the recited steps in any sequence unless expressly stated otherwise.

The example configurations described in this document do not represent all the examples that may be implemented or that are within the scope of the claims. The term "example" shall be interpreted to mean "serving as an example, instance, or illustration," and not "preferred" or "advantageous over other examples."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims shall be interpreted as invoking 35 U.S.C. 112(f) unless the words "means for" or "step for" are explicitly recited in the claim.

Unless explicitly stated otherwise or otherwise apparent from context, terms such as "processing," "computing," "calculating," "determining," "displaying," or the like, refer to the action and processes of an electronic computing device including a processor and memory.

The subject matter recited in the claims is not coextensive with and should not be interpreted as coextensive with any embodiment, feature, or combination of features described or illustrated in this document. This is true even if only a single embodiment of the feature or combination of features is illustrated and described.

Composition Related Terminology and Interpretative Conventions

Values expressed as a percentage, parts of, or a ratio are by weight unless expressly stated otherwise.

The description of a group or class of materials as suitable or preferred for a given purpose shall be understood as disclosing that a single member of the group or class or a mixture of any two or more members of the group or class are equally suitable or preferred.

The description of constituents in chemical terms refers to the constituents: (a) at the time of addition to any combination specified in the description (e.g., the formal or analytical concentration of a salt that dissociates in solution) and/or (b) generated in situ by chemical reactions with other constituents. The description of the constituents does not preclude other chemical interactions among the constituents of a mixture once mixed unless expressly stated otherwise.

The description of materials in ionic form additionally implies the presence of sufficient counter ions to produce electrical neutrality for the composition.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

PRIORITY PATENT DOCUMENTS INCORPORATED BY REFERENCE

Int'l Pat. App. No. PCT/US2024/042804, titled "Methods for Extracting Radioisotopes from Radiologically Contaminated Waste," filed on 16 Aug. 2024.

U.S. Prov. App. No. 63/519,961, titled "Methods for Extracting Radioisotopes from Nuclear Waste," filed on 16 Aug. 2023.

Additional Documents Incorporated by Reference

Int'l Pat. App. No. PCT/US2024/042807, titled "Methods for Recycling Metals from the Nuclear Industry," filed on 16 Aug. 2024.

What is claimed is:

1. A method of separating radioisotopes from ion exchange resin used to process nuclear waste, the method comprising:
   contacting the ion exchange resin with an aqueous solution including a salt or acid; and
   separating the aqueous solution from the ion exchange resin to form an enriched solution;
   wherein the enriched solution includes at least 80% of the activity of at least one of the radioisotopes in the ion exchange resin.

2. The method of claim 1 wherein contacting the ion exchange resin with the aqueous solution and separating the aqueous solution from the ion exchange resin comprises eluting the radioisotopes from the ion exchange resin with the aqueous solution.

3. The method of claim 1 wherein the ion exchange resin is a cation resin, the method comprising separating a mixed ion exchange resin into the cation resin and an anion resin.

4. The method of claim 1 wherein a majority of the ion exchange resin is a cation resin.

5. The method of claim 4 wherein at least 80% of the ion exchange resin is the cation resin.

6. The method of claim 1 wherein the aqueous solution includes a sulfate salt and/or a nitrate salt.

7. The method of claim 1 wherein the aqueous solution includes an alkali metal sulfate salt and/or an alkali metal nitrate salt.

8. The method of claim 1 wherein the aqueous solution has at least 0.1 M salt concentration.

9. The method of claim 1 wherein the aqueous solution has at least 0.5 M salt concentration.

10. The method of claim 1 wherein the enriched solution includes at least 95% of the activity of Sr-90, Co-60, Ni-63, Cs-137, C-14, Co-58, and/or Mn-54 radioisotopes in the ion exchange resin.

11. A method of separating radioisotopes from ion exchange resin used to process nuclear waste, the method comprising:
    contacting the ion exchange resin with an aqueous salt solution; and
    separating the aqueous salt solution from the ion exchange resin to form an enriched solution;
    wherein the enriched solution includes at least 80% of the activity of Sr-90, Co-60, Ni-63, Cs-137, C-14, Co-58, and/or Mn-54 radioisotopes in the ion exchange resin.

12. The method of claim 11 wherein contacting the ion exchange resin with the aqueous salt solution and separating the aqueous salt solution from the ion exchange resin comprises eluting the radioisotopes from the ion exchange resin with the aqueous salt solution.

13. The method of claim 12 comprising eluting no more than 10 bed volumes to produce the enriched solution.

14. The method of claim 11 wherein the enriched solution includes at least 95% of the activity of Sr-90, Co-60, Ni-63, Cs-137, C-14, Co-58, and/or Mn-54 radioisotopes in the ion exchange resin.

15. The method of claim 11 wherein the aqueous salt solution has at least 0.1 M salt concentration.

16. The method of claim 11 wherein the aqueous salt solution has at least 0.5 M salt concentration.

17. The method of claim 11 wherein the aqueous salt solution includes a sulfate salt and/or a nitrate salt.

18. The method of claim 11 wherein the aqueous salt solution includes an organic acid.

19. The method of claim 11 wherein the aqueous salt solution includes a chloride salt.

20. The method of claim 11 wherein the aqueous salt solution includes an alkali metal salt.

\* \* \* \* \*